Patented Dec. 3, 1935

2,022,654

UNITED STATES PATENT OFFICE 2,022,654

TREATMENT OF CELLULOSIC MATERIALS

Henry Dreyfus, London, England

No Drawing. Application February 28, 1934, Serial No. 713,309. In Great Britain March 7, 1933

19 Claims. (Cl. 92—9)

This invention relates to improvements in the treatment of cellulosic materials, and especially to the manufacture of cellulose from ligno-cellulosic materials, for example wood, straw and grass, in which the ligno-cellulosic materials are treated with a solvent for the lignin.

I have found that a highly satisfactory cellulosic product can be obtained from ligno-cellulosic materials by treating or extracting them with the solvents at a pressure greater than that developed by the solvent under the reaction conditions. By carrying out the extraction at such pressures an effective removal of lignin from the cellulose may be achieved at lower temperatures than when working at pressures generated solely by the solvent or solvent composition.

Such treatments may be effected under pressures up to 100 atmospheres or more above the pressure produced by the solution at the temperature employed. For example pressures between 5 and 50 atmospheres, and especially between 10 and 30 or 40 atmospheres higher than that produced by the solution may be applied.

Extraction may be effected at elevated temperatures, and is best effected at temperatures over 100° C., for example at temperatures between 150° and 250° C., and especially at temperatures between 165° and 220° C. At such temperatures the total pressure on the reactants may be, for example, between 20 atmospheres and 150 atmospheres, and especially between 40 atmospheres and 70 or 100 atmospheres.

The excess pressure required over and above the vapour pressure of the solvent or solvent composition under the prevailing conditions may be obtained by means of a compressed gas having no substantial deleterious effect on the extraction process. For example the extraction of the materials with the solvent or solvent composition may be effected in presence of compressed nitrogen or other relatively inert gas.

To facilitate impregnation of the material by the solvent or solvent mixture the former is preferably treated in a finely divided form. For example wood may advantageously be used in the form of chips or even of a mechanical pulp. The ligno-cellulosic material may be simply agitated with the solvent or solvent mixture or to aid the impregnation the digester or other vessel containing the material may be first evacuated to any desired degree before introducing the solvent or solvent mixture. Other methods may be used to facilitate impregnation, for example the sudden release of pressure within the materials, whereby the active surface of the materials is increased to a very large extent. As described in my U. S. application S. No. 565,203 filed September 25, 1931, such a process may be carried out by causing the sudden vaporization of a liquid within the material. Any other method of securing an efficient contact between the material and the solvent or solvent mixture may be employed.

The treatment of the ligno-cellulosic material with the solvent or solvent mixture may be effected in a single stage or two- or multi-stage process and in a continuous or discontinuous manner. For example the extraction may be performed in digesters or vessels such as are commonly employed in pulping processes, for example in the sulphite process. In another method of carrying out the invention the material may be subjected to a continuous extraction with the solvent or solvent mixture. For example the material may be caused to travel through a reaction vessel in a direction counter to that of a stream of solvent or solvent mixture. In any case the solvent or solvent mixture may, after the treatment, be freed from lignin and other substances and returned to the process. For example the solvent or solvent mixture may be distilled off, leaving the lignin and other substances in the solid form.

If desired, the extraction of the lignin from the ligno-cellulosic materials may follow a preliminary treatment of the materials with hot or boiling water or water under pressure or with alkali solutions or acid solutions, but such preliminary treatments may, in general, be omitted. The solvent or solvent composition may be employed in association with small quantities of acid or basic substances, for example hydrochloric or sulphuric acid, or an organic acid such as formic acid or acetic acid, or oxides or hydroxides of the alkali metals or the metals of the alkaline earths. Moreover, acids or basic salts such as sodium bisulphite or bisulphate or sodium carbonate or magnesium carbonate may be employed. Such acid or basic substances may advantageously be present in amount of 0.1% or less of the amount of the solvent. Mineral acids if present during the extraction should be present only in very small quantities or very low concentrations, particularly if temperatures above 100° C. are employed for the extraction. Similarly, alkalies are liable to exert a degrading action upon the cellulose at high temperatures, and it is preferable in employing either mineral acids or alkalies to soften the materials, to carry out the softening process as a pretreatment before the extracting step proper, and to remove or substantially remove the acid or alkali used for the softening before carrying out the extraction step. Such removal may, for example, be effected by washing with water or with a solvent, for example the solvent or solvent mixture subsequently to be used for the extraction.

If desired the ligno-cellulosic material may be subjected to other treatments prior to extraction by the process of the present invention, for example to treatments to remove resins. Thus, a simple extraction of the resins with benzene or benzene-alcohol mixtures may be applied. However, the resins are usually quite readily extracted in the process of the present invention, and such a procedure is generally unnecessary unless the lignin is required in a more or less purified form.

The present invention includes quite broadly extraction of the lignin from ligno-cellulosic materials with solvents under pressures in excess of those developed by the vapors of the solvents. As solvents there may be used ketones, for example acetone, methyl ethyl ketone, methyl cyclohexanone, or other ketonic substances, for example pyruvic acid, diacetone alcohol, tetrahydropyrone (1.4-oxanone) and its homologues and substitution products, alcohols, including ethyl alcohol, isopropyl alcohol, ethylene glycol, diethylene glycol and glycerol, ethers, for instance diethyl ether, ethyl propyl ether, di-iso propyl ether and cyclic ethers such as dioxane, methylene ethylene ether and homologues and derivatives of these cyclic ethers, for example dimethyl dioxane, and partially or completely etherified glycols or other polyhydric alcohols, for instance the mono- or dimethyl or ethyl ethers of ethylene glycol. Similarly, lower fatty acids, and particularly acetic acid, may be used, and even formic acid, though this is not so useful as acetic acid since under the temperature and pressure conditions obtaining formic acid is liable to give rise to an undue amount of degradation of the cellulose. Esters of organic carboxylic acids, and especially of the lower fatty acids, for example methylene or ethylene formate or acetate are also valuable. While the above solvents may be used alone for the extraction, it is particularly advantageous to employ them in admixture with water. Thus, for instance, acetone may be employed as an aqueous solution in a concentration of 50–80%, or ethyl alcohol may be employed in a concentration of about 30–70%. Dioxane is advantageously employed in concentrations similar to those given for acetone.

Mixtures of organic liquids of different polarities may likewise be employed for the extraction. Thus, mixtures of alcohols, ketones, aldehydes, esters or acids may be employed in admixture with non-polar organic solvents, for example benzene, toluene, xylene or other hydrocarbons, carbon tetrachloride, hexa-chlorethane or similar non-polar chlorinated hydrocarbons. Again, mixtures of strongly polar liquids such as the alcohols, ketones, aldehydes, esters or acids may be employed together with less strongly polar liquids such as the ethers, for example diethyl ether or di-isopropyl ether. Again, three or more organic liquids having different polarities may be employed, for instance mixtures of methyl ethyl ketone or other ketones with ethers such as di-isopropyl ether and hydrocarbons or non-polar chlorinated hydrocarbons, or mixtures of ketones, for example methyl ethyl ketone, with cyclic ethers, for instance dioxane and hydrocarbons or other non-polar solvents. Thus, I may employ a mixture of 90% ethyl alcohol and 10% benzene, a mixture of 40 to 60 parts of dioxane with 60 to 40 parts of acetone, a mixture of 40 to 70% methylene or ethylene chloride or other polar chlorinated hydrocarbons with 60 to 30% methyl, ethyl or isopropyl alcohol, or a mixture of 40 to 60 parts of acetone or alcohol with 60 to 40 parts of diethyl ether or di-isopropyl ether. Generally in such mixtures it is preferable to have present at least one component which is soluble in water.

The invention includes carrying out the extraction process under a pressure in excess of that developed by the vapors of the solvents either throughout the whole extraction or during any part of the extraction. Thus, if desired, the extraction may be begun under the pressures developed by the vapors of the solvents, and excess pressure may be produced during the extraction by pumping in nitrogen or other inert gas. Similarly, the pressure may be reduced towards the end of an extraction process in accordance with the present invention. However, in general it is preferable to maintain the excess pressure throughout the whole of the extraction. In starting up an extraction in accordance with the present invention the solvents and the cellulosic material may be introduced into a pressure vessel at atmospheric temperature and the desired excess pressure produced by pumping in nitrogen at this stage prior to heating to the extraction temperature, or alternatively the materials may be heated to the desired extraction temperature and the excess pressure produced subsequently.

The cellulose produced by the process of the present invention may be employed, if desired after any other treatment, for any of the purposes for which cellulose is used, for example for the manufacture of cellulose ethers, cellulose nitrate or cellulose xanthate, or for the manufacture of paper, especially the better classes of paper, or for the manufacture of other cellulose derivatives. In the case of the manufacture of cellulose acetate or other organic derivatives of cellulose, it is advantageous to apply a pretreatment before carrying out the esterification process. Thus, the extracted cellulose may be subjected to treatment with lower fatty acids if a lower fatty acid has not already been employed in the extraction process. Again, a two-stage pretreatment may be applied such as that described in my U. S. Patent No. 1,711,110 involving a preliminary treatment with hot dilute alkali or with cold strong alkali followed by a treatment with an organic acid and particularly a lower fatty acid.

The following examples illustrate the invention:—

*Example 1*

Wood chips are mixed with 8 to 10 times their weight of a 50 to 60% aqueous solution of dioxane in an autoclave. Nitrogen is then pumped in until a pressure of about 20–25 atmospheres is attained. The contents of the autoclave are then heated to a temperature of 170–190° C. for 2 to 3 hours, after which the solvent may be withdrawn, preferably without reducing the pressure, and further solvent introduced. The extraction may thus be carried out in stages and is generally complete after digestion with the solvent mixture for about 9 to 12 hours. In the second or later stages of the extraction the temperature may be increased somewhat, for example to about 220–230° C. The cellulosic material remaining after the extraction may be washed, for example with water or with alcohol.

Example 2

Wood chips are sprayed with their own weight of a mixture of 30 parts of concentrated hydrochloric acid and 70 parts of glacial acetic acid and are allowed to remain at atmospheric temperature for 6 hours. After this period the cellulose is washed thoroughly first with water and then with a mixture of di-isopropyl ether and ethyl alcohol in equal parts by volume. The wood chips are then mixed with 8-10 times their weight of a mixture of equal parts by volume of isopropyl ether and ethyl alcohol in a suitable pressure vessel. The vessel is then heated to a temperature of 180-200° C. and after reaching this temperature nitrogen is pumped in so as to produce an increase of 40 atmospheres in the pressure. The conditions are then maintained for 2-3 hours, after which the solvent may be withdrawn, preferably without reducing the pressure, and further solvent introduced. Extraction may thus be carried out in stages and is generally complete after digestion with a solvent mixture for about 9-12 hours. In the second or later stages of the extraction the temperature may be increased somewhat, for example to about 220° C. The cellulosic material remaining after the extraction may be washed, for example with water or an alcohol.

Example 3

Wood chips are treated as described in Example 1 or 2, with the exception that the extracting liquid consists of a 50% aqueous solution of ethyl alcohol.

Example 4

Wood chips are treated as described in Example 1 or 2 with the exception that the extracting liquid consists of a mixture of equal parts of methylene chloride and methyl alcohol and the temperature is maintained throughout the extraction at 170 to 180° C.

Example 5

Wood chips are treated as in Example 1 or 2 with the exception that as extracting agent there is used a mixture of 50 parts by volume of dioxane with 50 parts of acetone.

Example 6

Wood chips are treated as in Example 1 or 2 with the exception that as extracting agent there is used a mixture of 50 parts by volume of alcohol, 30 parts of acetone and 20 parts of benzene.

The term "organic solvent medium", as hereinafter employed in the claims, is to be construed as including within its scope single organic solvents and organic solvent mixtures which are solvents for lignin and which may comprise water.

What I claim and desire to secure by Letters Patent is:—

1. Process for the production of cellulose from lignocellulosic materials, which comprises extracting lignin from the materials in solution in an organic solvent medium at an elevated temperature under a pressure in excess of that developed by the solvent medium at the temperature employed.

2. Process for the production of cellulose from lignocellulosic materials, which comprises extracting lignin from the materials in solution in an organic solvent medium at a temperature in excess of 100° C. under a pressure in excess of that developed by the solvent medium at the temperature employed.

3. Process for the production of cellulose from lignocellulosic materials, which comprises extracting lignin from the materials in solution in an organic solvent medium at a temperature between 165° and 220° C. under a pressure in excess of that developed by the solvent medium at the temperature employed.

4. Process for the production of cellulose from lignocellulosic materials, which comprises extracting lignin from the materials in solution in an organic solvent medium at an elevated temperature under a pressure more than 5 atmospheres in excess of that developed by the solvent medium at the temperature employed.

5. Process for the production of cellulose from lignocellulosic materials, which comprises extracting lignin from the materials in solution in an organic solvent medium at an elevated temperature under a pressure more than 10 atmospheres in excess of that developed by the solvent medium at the temperature employed.

6. Process for the production of cellulose from lignocellulosic materials, which comprises extracting lignin from the materials in solution in an organic solvent medium at a temperature between 165° and 220° C. under a pressure more than 10 atmospheres in excess of that developed by the solvent medium at the temperature employed.

7. Process for the production of cellulose from lignocellulosic materials, which comprises extracting lignin from the materials in solution in an organic solvent medium comprising an alcohol at an elevated temperature under a pressure in excess of that developed by the medium at the temperature employed.

8. Process for the production of cellulose from lignocellulosic materials, which comprises extracting lignin from the materials in solution in an organic solvent medium comprising an ether at an elevated temperature under a pressure in excess of that developed by the medium at the temperature employed.

9. Process for the production of cellulose from lignocellulosic materials, which comprises extracting lignin from the materials in solution in an organic solvent medium comprising a ketone at an elevated temperature under a pressure in excess of that developed by the medium at the temperature employed.

10. Process for the production of cellulose from lignocellulosic materials, which comprises extracting lignin from the materials in solution in aqueous ethyl alcohol at a temperature between 165° and 220° C. under a pressure more than 5 atmospheres in excess of that developed by the aqueous alcohol at the temperature employed.

11. Process for the production of cellulose from lignocellulosic materials, which comprises extracting lignin from the materials in solution in an organic solvent medium comprising a mixture of organic solvents of different polarities at an elevated temperature under a pressure in excess of that developed by the medium at the temperature employed.

12. Process for the production of cellulose from lignocellulosic materials, which comprises extracting lignin from the materials in solution in an organic solvent medium comprising a mixture of organic solvents of different polarities at an elevated temperature under a pressure more than 5 atmospheres in excess of that developed by the medium at the temperature employed.

13. Process for the production of cellulose from lignocellulosic materials, which comprises extracting lignin from the materials in solution in an organic solvent medium comprising a polar liquid and a non-polar liquid at an elevated temperature under a pressure in excess of that developed by the medium at the temperature employed.

14. Process for the production of cellulose from lignocellulosic materials, which comprises extracting lignin from the materials in solution in an organic solvent medium comprising organic liquids containing different polar groups at an elevated temperature under a pressure in excess of that developed by the solvent medium at the temperature employed.

15. Process for the production of cellulose from lignocellulosic materials, which comprises extracting lignin from the materials in solution in an organic solvent medium comprising an alcohol and a hydrocarbon at a temperature between 165° and 220° C. under a pressure more than 5 atmospheres in excess of that developed by the solvent medium at the temperature employed.

16. Process for the production of cellulose from lignocellulosic materials, which comprises extracting lignin from the materials in solution in an organic solvent medium comprising an alcohol and a polar chlorinated hydrocarbon at a temperature between 165° and 220° C. under a pressure more than 5 atmospheres in excess of that developed by the solvent medium at the temperature employed.

17. Process for the production of cellulose from lignocellulosic materials, which comprises extracting lignin from the materials in solution in an organic solvent medium comprising an alcohol and an ether at a temperature between 165° and 220° C. under a pressure more than 5 atmospheres in excess of that developed by the solvent medium at the temperature employed.

18. Process for the production of cellulose from lignocellulosic materials, which comprises extracting lignin from the materials in solution in an organic solvent medium comprising a ketone and an ether at a temperature between 165° and 220° C. under a pressure more than 5 atmospheres in excess of that developed by the solvent medium at the temperature employed.

19. Process for the production of cellulose from lignocellulosic materials, which comprises subjecting the materials to a treatment with water under pressure and then extracting the lignin from the materials in solution in an organic solvent medium at an elevated temperature under a pressure in excess of that developed by the solvent medium at the temperature employed.

HENRY DREYFUS.